(12) United States Patent
Baptist et al.

(10) Patent No.: US 10,122,795 B2
(45) Date of Patent: Nov. 6, 2018

(54) CONSISTENCY LEVEL DRIVEN DATA STORAGE IN A DISPERSED STORAGE NETWORK

(71) Applicant: International Business Machines Corporation, Armonk, NY (US)

(72) Inventors: Andrew D. Baptist, Mt. Pleasant, WI (US); Greg R. Dhuse, Chicago, IL (US); Ravi V. Khadiwala, Bartlett, IL (US); Ilya Volvovski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/168,635

(22) Filed: May 31, 2016

(65) Prior Publication Data
US 2017/0346900 A1 Nov. 30, 2017

(51) Int. Cl.
*H04L 29/08* (2006.01)

(52) U.S. Cl.
CPC .......... *H04L 67/1097* (2013.01); *H04L 67/02* (2013.01)

(58) Field of Classification Search
CPC .................. H04L 67/1095–67/1097; H04L 67/02–67/1002; H04L 65/40–65/4023
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Clayton R Williams
(74) *Attorney, Agent, or Firm* — Garlick & Markison; Timothy W. Markison; Patricia A. Markison

(57) ABSTRACT

A method begins by a processing module of a computing device, in response to sending a set of write requests regarding a set of encoded data slices sent to a set of storage units, receiving write response ballots from some storage units. The method continues with the processing module interpreting the write response ballots to determine whether the write requests have a consensus number of highest rankings. When the computing device has the consensus number of highest rankings, the method continues with the processing module interpreting the write response ballots to determine whether a write threshold number of encoded data slices is listed in lists of correctly stored new revision levels. When the write threshold number of encoded data slices is listed, the method continues with the processing module issuing a set of finalize commands to the set of storage units.

18 Claims, 9 Drawing Sheets

(56) References Cited

U.S. PATENT DOCUMENTS

| | | |
|---|---|---|
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

distributed computing system 10

FIG. 4

CONSISTENCY LEVEL DRIVEN DATA STORAGE IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize a three-phase process for writing consistently in a dispersed storage network (DSN) memory, where the three phases include: (1) A write phase; (2) A commit phase; and (3) A finalize phase. The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage.

BRIEF DESCRIPTION OF THE SEVERAL VIEWS OF THE DRAWING(S)

FIG. 4 is schematic block diagram of another example of a phase of a write operation in a dispersed storage network (DSN) in accordance with the present invention;

DETAILED DESCRIPTION OF THE INVENTION

Figure 1:
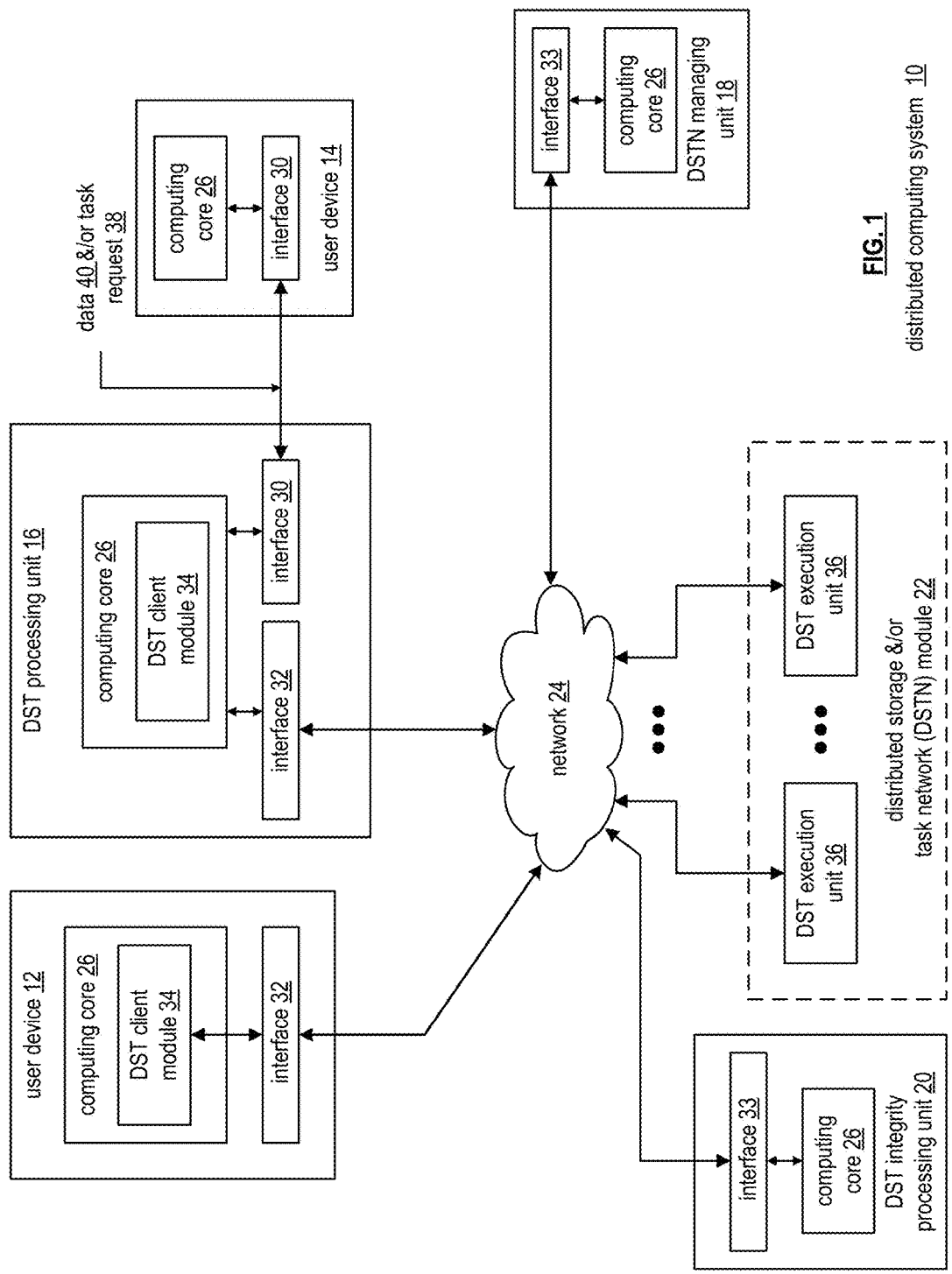
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to the interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
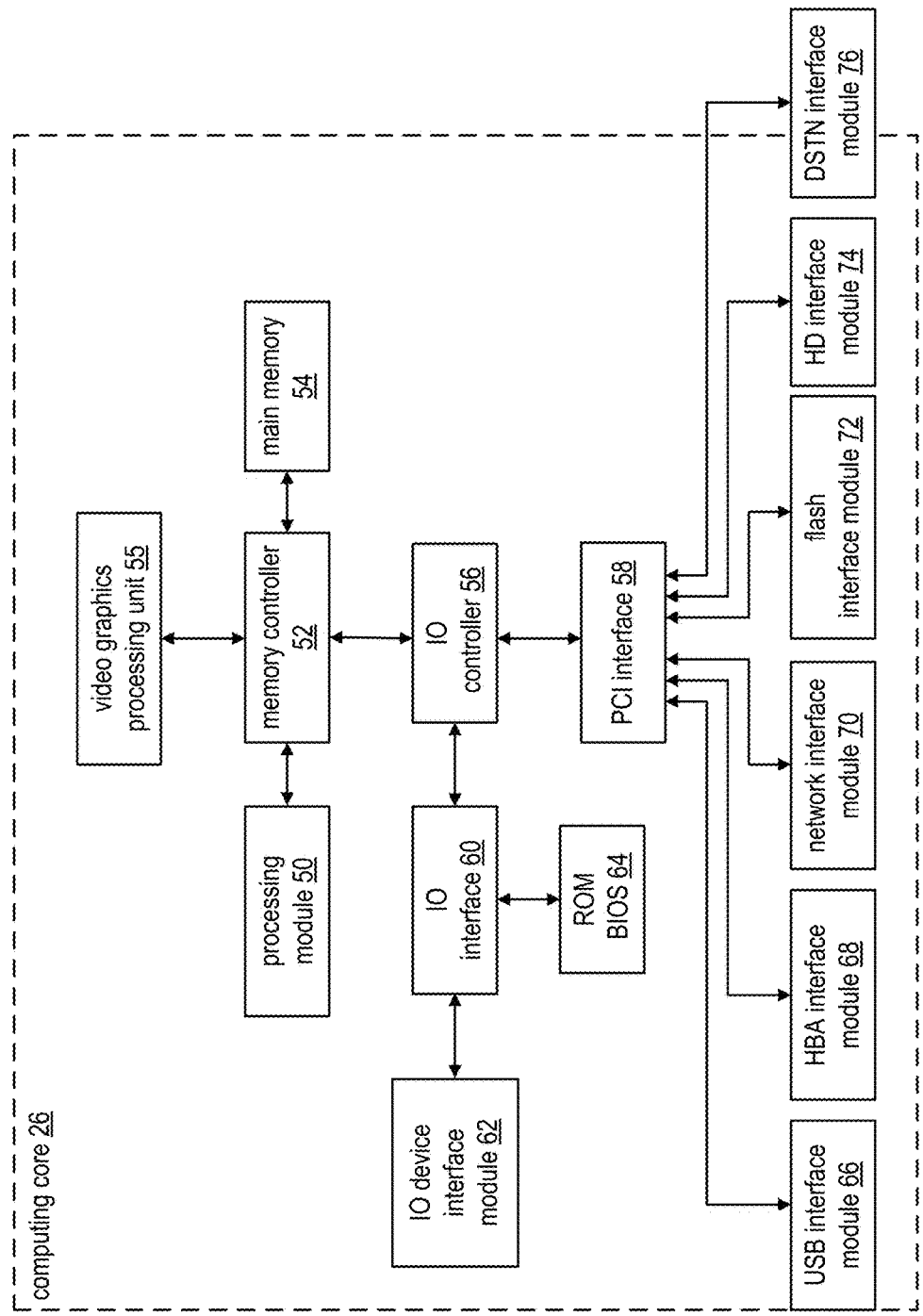
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

FIGS. 3, 5-6, and 8 are schematic block diagrams of an embodiment of a dispersed storage network (DSN) that includes distributed storage and task (DST) processing units A and B, the network 24 of FIG. 1, and a set of DST execution units 1-5. Hereafter, each DST processing unit may be interchangeably referred to as a computing device of one or more computing devices of the DSN, where each computing device includes an interface, a memory, and a processing module. The interface may be implemented utilizing the interface 32 of FIG. 1. The memory may be implemented utilizing the main memory 54 of FIG. 2 and/or any other memory devices including a solid-state memory and a magnetic disk drive memory. The processing module may be implemented utilizing the processing module 50 of FIG. 2. Each DST processing unit may be implemented utilizing the DST processing unit 16 of FIG. 1.

Each DST execution unit may be implemented utilizing the DST execution unit 36 of FIG. 1 and includes one or more memory devices. Hereafter, each DST execution unit may be interchangeably referred to as a storage unit and the set of DST execution units may be interchangeably referred to as a set of storage units. The DSN functions to store data facilitating revision consistency, where data files associated with a plurality of revisions of a data object are dispersed storage error encoded to produce a one or more sets of encoded data slices for each of the plurality of revisions, and where requests to store the one or more sets of encoded data slices are processed in accordance with the revision consistency. Such revision consistency ensures that a desired threshold number of encoded data slices of each set of encoded data slices associated with a particular revision are successfully stored as a current revision within the set of DST execution units.

Figure 3:
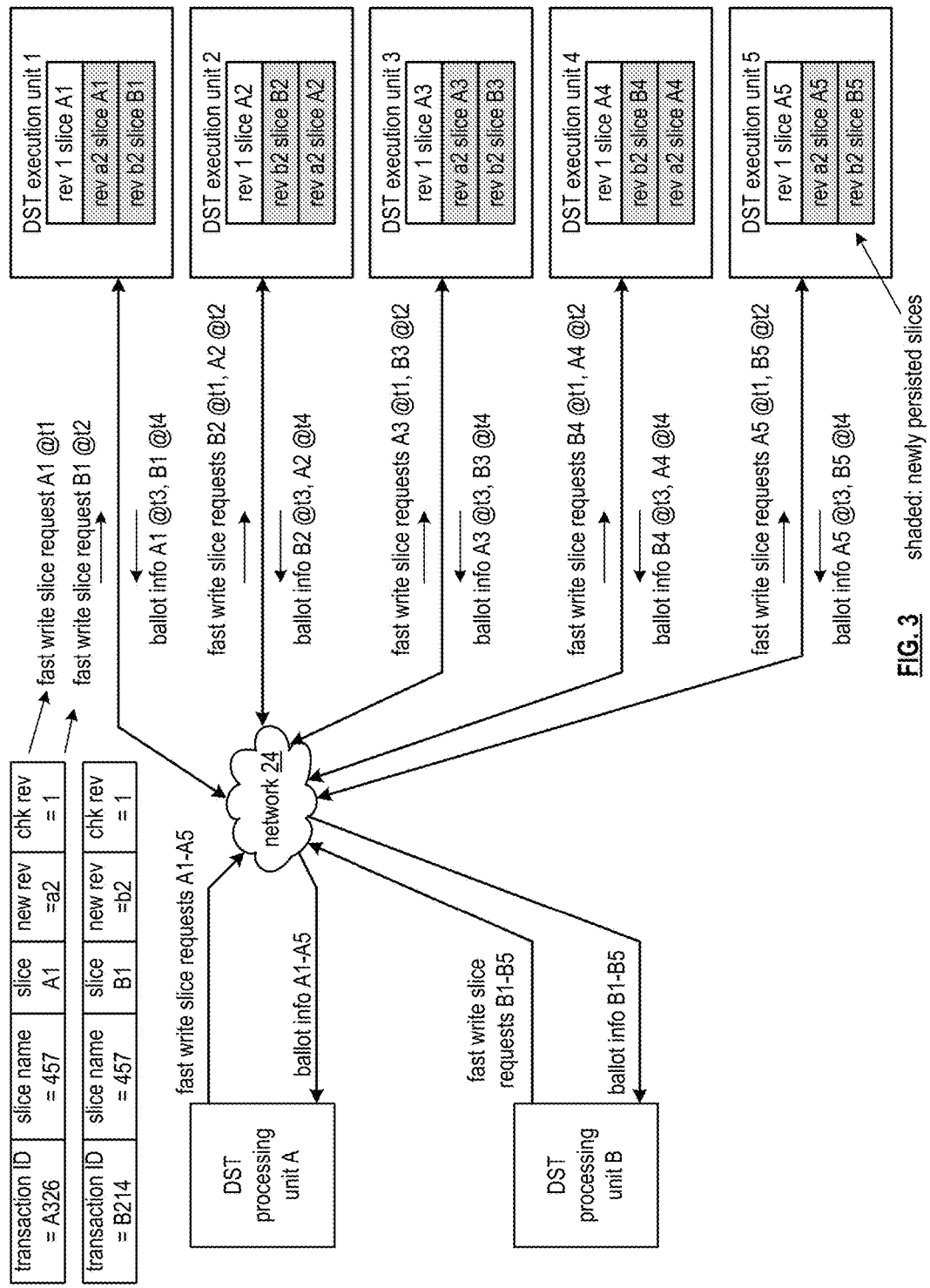
FIG. 3 is schematic block diagram of an example of a phase of a write operation in a dispersed storage network (DSN) in accordance with the present invention.

FIG. 3 illustrates an example of operation of the storing of the data with the revision consistency where the DST processing unit A (e.g., the computing device) sends a set of write requests regarding a set of encoded data slices to the set of storage units and the DST processing unit B (e.g., another computing device) sends another set of write requests regarding another set of encoded data slices to the set of storage units (e.g., another revision for the same data). For example, the DST processing unit A sends, via the network 24, a set of fast write slice requests A1-A5 to the set of DST execution units 1-5 and the DST processing unit B sends, via the network 24, another set of fast write slice requests B1-B5 to the set of DST execution units 1-5. Each write request includes one or more of a transaction identifier (ID), a slice name corresponding to an encoded data slice, the encoded data slice, a new revision level indicator, a check revision level indicator (e.g., expected current revision as stored in an associated storage unit). For example, the fast write slice request A1 includes a transaction ID of A326, a slice name of 457, an encoded data slice A1, a new revision level a2, and a check revision level of 1, and the fast write slice requests B1 includes a transaction ID of B214, the slice name of 457, an encoded data slice B1, a new revision level b2, and the check revision level of 1.

The set of write requests and the other set of write requests may be received with varying time arrival order by the DST execution units. For example, DST execution unit 1 receives the fast write slice request A1 at a first time frame and receives the fast write slice request B1 at a second time frame (e.g., after receiving the fast write slice request A1). As another example, DST execution unit 2 receives the fast write slice request B2 at the first time frame and receives the fast write slice request A2 at the second time frame (e.g., after receiving the fast write slice request B2). As a whole, the set of DST execution units may receive more write requests first from one of the DST processing units. For example, the DST execution units 1, 3, and 5, receive the fast write slice requests A1, A3, and A5 ahead of the fast write slice requests B1, B2, and B5; and the DST execution units 2 and 4 receives the fast write slice requests B2 and B4 ahead of the fast write slice requests A2 and A4.

In response to sending the set of write requests regarding the set of encoded data slices sent to the set of storage units of a the DSN, the computing device (e.g., the DST processing unit A) receives, at least a subset of write response ballots from at least a subset of storage units of the set of storage units. A write response ballot of the at least the subset of write response ballots is received from a storage unit of the at least the subset of storage units regarding an encoded data slice of the set of encoded data slices.

The write response ballot includes a list of correctly stored new revision levels of the encoded data slice of pending write requests regarding the new revision levels of the set of encoded data slices and a ranking list of the pending write requests and wherein the at least the subset of write response ballots includes at least a subset of lists of correctly stored new revision levels and at least a subset of ranking lists. For example, upon receipt of the fast write slice request A1, the DST execution unit 1 issues, via the network 24, to the DST processing unit A, ballot information A1 at a third timeframe, where the ballot information A1 includes a list of correctly stored new revision levels of the encoded data slice 457 at that point in time (e.g., revision 1 of slice A1 as a previously successfully stored slice, and the encoded data slice A1 of revision a2 as a new slice). The ballot info A1 further indicates the ranking list of the pending write requests indicating that the fast write slice request A1 is the only pending write request at that point in time (e.g., shortly after timeframe 1 but before timeframe 2 when the fast write slice request B1 is received).

Figure 4:
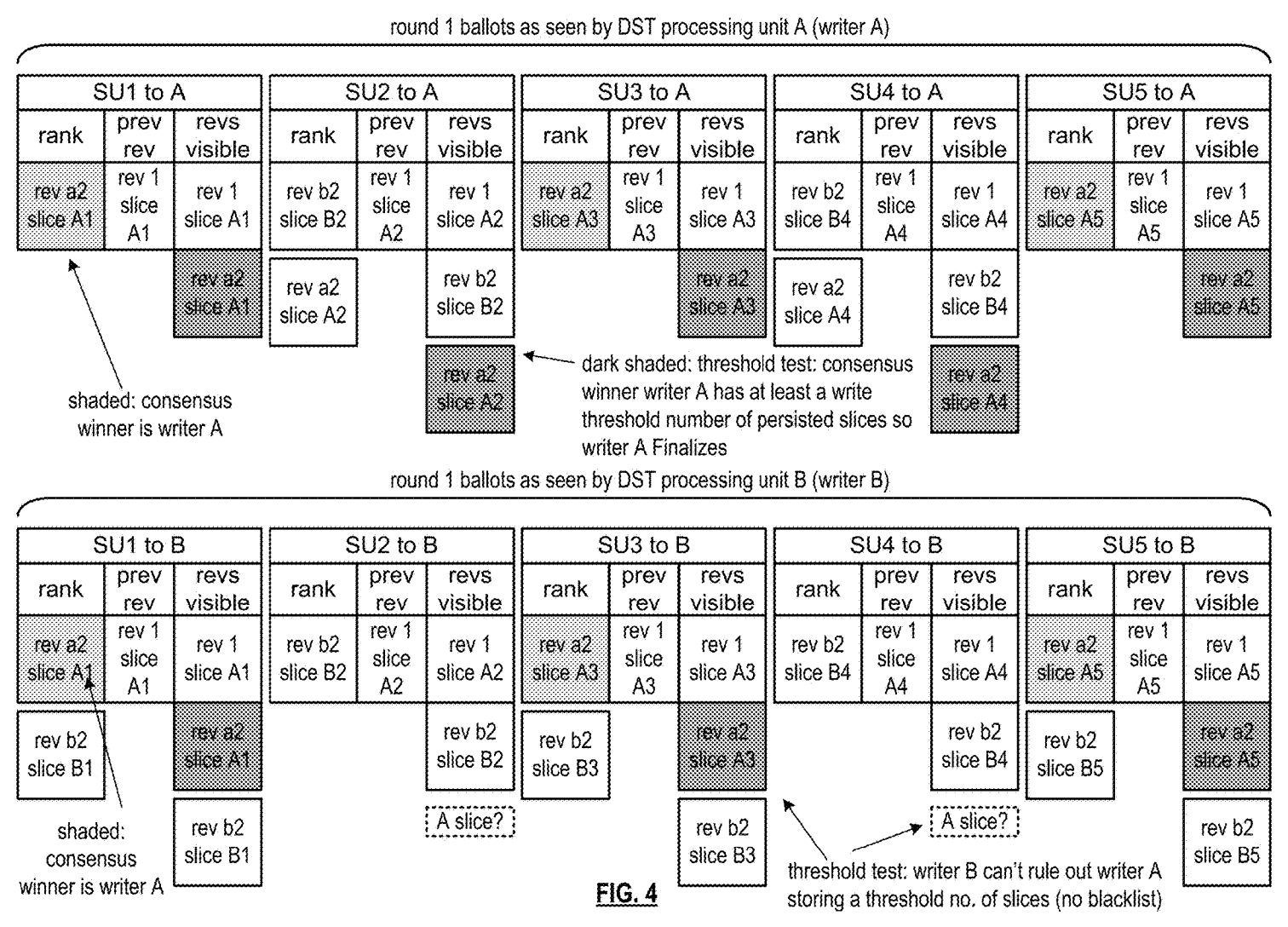

When another write request is received by the storage unit, the storage unit issues further ballot information to the other computing device. For example, when receiving the fast write slice request B1, the DST execution unit 1 issues, via the network 24, to the DST processing unit B, ballot information B1 at a fourth timeframe, where the ballot information B1 includes a list of correctly stored new revision levels of the encoded data slice 457 at that point in time (e.g., the revision 1 of slice A1 as the previously successfully stored slice, the encoded data slice A1 of revision a2 as the new slice, and the encoded data slice B1 of revision b2 as another new slice). The ballot info B1 further indicates the ranking list of the pending write requests indicating that the fast write slice request A1 was received first and the fast write slice request B1 was received second at that point in time. As such, the DST processing unit A receives an indication that its request A1 was received first by the DST execution unit 1 and the DST processing unit B receives an indication that its request B1 was received second after the request A1 received from the DST processing unit A. Similarly, with regards to the requests sent to the second DST execution unit, the DST processing unit A receives ballot information indicating that its request A2 was received second after the request B2 received from the DST processing unit B (e.g., and slices B2 and A2 were successfully correctly stored within the DST execution unit 2) and the DST processing unit B receives an indication that its request B2 was received first by the DST execution unit 2 (e.g., and slice B2 was successfully in correctly stored within the DST execution unit 2). FIG. 4 further illustrates the example of operation with regards to a perspective by each of the DST processing units A and B receiving the ballot information from the entire set of DST execution units.

Figure 7:
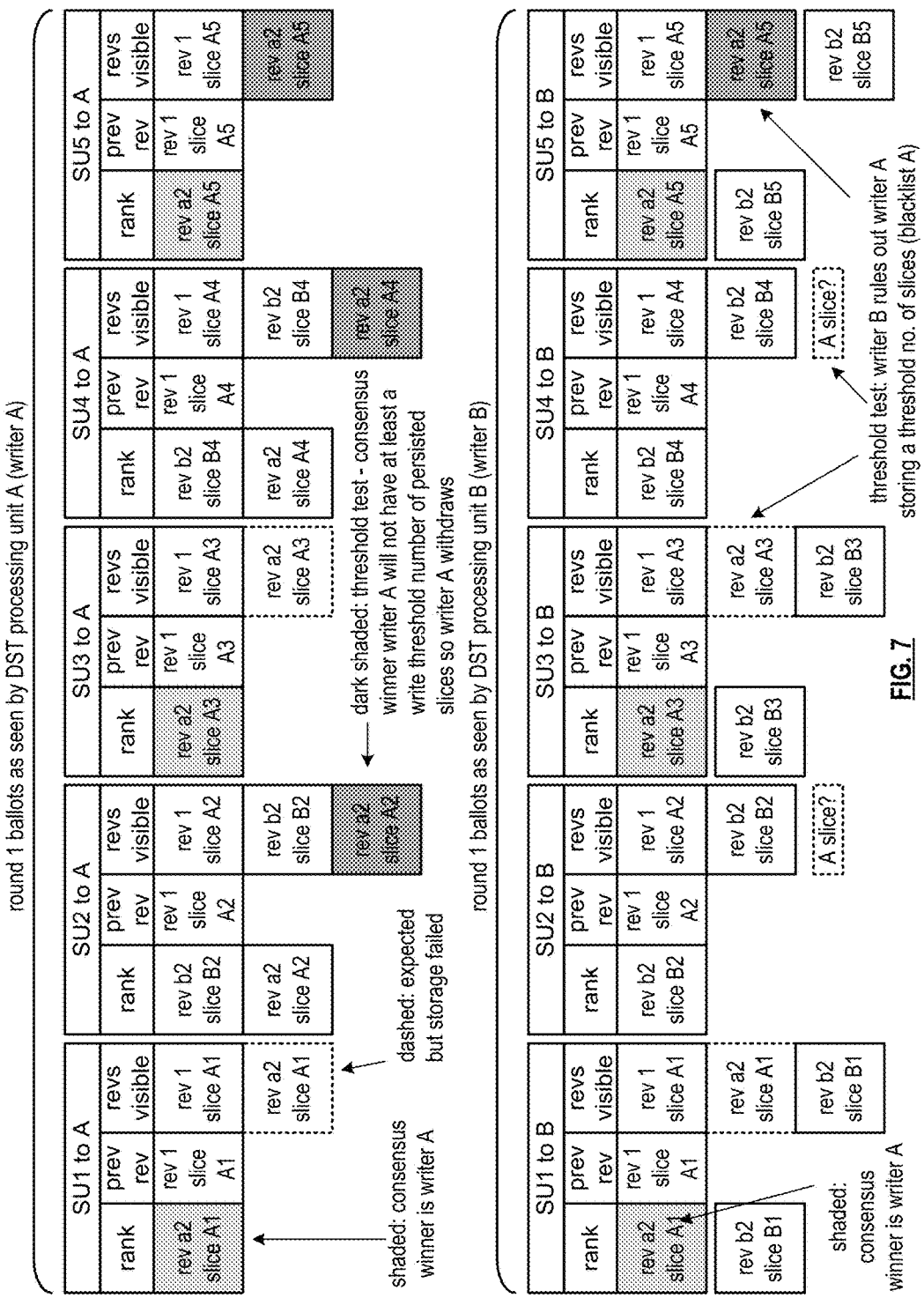
FIG. 7 is schematic block diagram of another example of another phase of a write operation in a dispersed storage network (DSN) in accordance with the present invention.

FIGS. 4 and 7 are diagrams illustrating examples of receiving ballot information, where a top portion illustrates ballot information received by the DST processing unit A from each of the storage units 1-5 and a bottom portion illustrates ballot information received by the DST processing unit B from each of the storage units 1-5. The ballot information received from each of the storage units includes three fields, including a rank field, a previous revision field, and a revisions visible field. The rank field indicates a ranking order of one or more write requests received by the storage unit for a common slice name (e.g., a top request indicates a highest-ranking, a second to top request indicates a second highest-ranking, etc.). The previous revision field indicates one revision of a currently stored encoded data slice of the slice name (e.g., a single current revision). The revisions visible field indicates revision levels of at least temporarily stored encoded data slices of the slice name that are visible for subsequent read requests. The temporarily stored encoded data slices includes encoded data slices received from one or more write requests during an overall write transaction that is open until the overall transaction is closed (e.g., when receiving a finalize command, a cleanup command, upon an expiration of a overall transaction timeframe that begins when a first write request is received by a storage unit).

FIG. 4 illustrates receiving ballot information in the example of operation where the DST processing unit A (e.g., which hereafter may be interchangeably referred to as writer A) receives a write response ballot that includes the ballot information from the storage units 1-5. The write response ballot from the storage unit 1 to the DST processing unit A indicates that the write request from the DST processing unit A is the first highest ranked received write request, that the previously stored current revision is the revision 1 slice A1, and that revision 1 slice A1 is currently stored as is the revision a2 of encoded data slice A1. In total, the DST processing unit A receives five write response ballots indicating that the DST processing unit A has the highest-ranking for three of the five storage units and that each of the five encoded data slices A1-A5 of revision a2 have been stored in the storage units 1-5. The DST processing unit B receives five other write response ballots indicating that the DST processing unit A has the highest ranking for the three of the five storage units and that each of the five encoded data slices B1-B5 of revision b2 have been stored in the storage units 1-5.

The DST processing unit interprets the at least the subset of write response ballots to determine whether write requests of the set of write requests (e.g., from the DST processing unit A) has a consensus number of highest rankings in the at least the subset of ranking lists. The determining the highest ranking within the ranking list based on a timestamp of when write requests of the pending write requests were received by the storage unit. For example, the DST processing unit A indicates that the write requests of the set of write requests A1-A5 has the consensus number of highest rankings when the DST processing unit A determines that the write requests 1, 3, and 5 have an earlier timestamp (e.g., first arrival at the corresponding storage unit) but the write requests 2 and 4 have a second earliest timestamp.

The determining whether the computing device has the consensus number may further include the computing device determining whether another computing device also has the consensus number of the highest rankings in the at least the subset of ranking lists (e.g., a tie). When the other computing device also has the consensus number of the highest rankings, the computing device implements a conflict avoidance protocol to establish that the computing device or the other computing device has the consensus number. For example, the conflict avoidance protocol includes selecting a particular computing device associated with an earliest timestamp of all received timestamps associated with the receiving of the write requests.

When the computing device has the consensus number of highest rankings in the at least the subset of ranking lists, the computing device interprets the at least the subset of write response ballots to determine whether a write threshold number of encoded data slices of the set of encoded data slices is listed in the at least the subset of lists of correctly stored new revision levels. For example, the DST processing unit A indicates that the write threshold number of encoded data slices of the set of encoded data slices is listed in the at least a subset of lists of correctly stored new revision levels when interpreting the received write response ballots that indicates that all five slices A1-A5 have been correctly stored and the write threshold is 4. Alternatively, when the write threshold number of encoded data slices of the set of encoded data slices is not listed in the at least the subset of lists of correctly stored new revision levels, the computing device may issue a set of withdraw commands to the set of storage units regarding the set of encoded data slices and further determining that it is not possible to store the write threshold number. When it is possible to store the write threshold number, the computing device may wait for the write threshold to be correctly stored (e.g., received further write response ballots from further storage units).

When the write threshold number of encoded data slices is listed in the at least the subset of lists of correctly stored new revision levels, the computing device may verify a current revision level of the encoded data slice (e.g., a check revision of the write request matches a local current rev of a stored slice), where the write response ballot includes a local current revision level of the encoded data slices of the storage unit. For example, the DST processing unit A indicates that the current revision level is verified when the received write response ballots include the previous revision of the revision 1 of slice A1 which matches the check revision of the write requests. When not verified, the computing device may rule out the computing device as a consensus winner and seek another computing device as the consensus winner.

When a particular computing device does not have the consensus number of the highest rankings in the at least the subset of ranking lists, the particular computing device interprets the at least the subset of write response ballots to determine whether yet another computing device has the consensus number of the highest rankings in the at least the subset of ranking lists, where the other computing device is associated with one of the pending write requests. For example, the DST processing unit B indicates that the DST processing unit B does not have the consensus number of the highest rankings when interpreting the received write response ballots that indicates that write requests 2 and 4 were the only first place received write requests from the DST processing unit B and that the DST processing unit A is the consensus winner with three of five write requests being received first. Alternatively, if no consensus winner is determined so far but is still possible, the computing devices may wait for further write response ballots and make the determination later.

When the other computing device does have the consensus number of the highest rankings in the at least the subset of ranking lists, the particular computing device interprets the at least the subset of write response ballots to determine whether the write threshold number of encoded data slices of another set of encoded data slices is listed in the at least the subset of lists of correctly stored new revision levels, where the other computing device issued another set of write requests for the another set of encoded data slices, where the another set of encoded data slices has a first revision level regarding a data segment of a data object and the set of encoded data slices has a second revision level regarding the data segment. For example, recognizing that the DST processing unit A is the consensus winner, the DST processing unit B interprets the received write response ballots to determine that the storage units are not storing the write threshold number of encoded data slices from the DST processing unit A at this time, noting that it is possible that storage units 2 and 4 have received a corresponding slice from the DST processing unit A (e.g., write threshold possible from the writer A). When correct storage of the write threshold number of encoded data slices of the consensus winner is still possible, the particular computing device may wait for further write response ballots. For example, the, DST processing unit B waits when determining that the DST processing unit A is the consensus winner, might have correctly stored the at least a write threshold number of encoded data slices, and the check revision matches the current revision for what has been received so far (e.g., as illustrated). When the particular computing device determines that the other computing device will never achieve the correct storage of the write threshold number of encoded data slices, the particular computing device will rule out the other computing device and seek another consensus winner.

When the write threshold number of encoded data slices of the other set of encoded data slices is listed in the at least the subset of lists of correctly stored new revision levels and the check revision is verified with the current revision, the particular computing device issues a set of withdraw commands to the set of storage units regarding the set of encoded data slices. For example, the DST processing unit B will issue the withdraw commands with regards to slices B1-B5 when determining that the DST processing unit A is the consensus winner, has its correctly stored at least a write threshold number of encoded data slices, and the check revision matches the current revision.

When the write threshold number of encoded data slices of another set of encoded data slices is not listed in the at least the subset of lists of correctly stored new revision levels, the computing device interprets the at least the subset of write response ballots to determine whether write requests of the set of write requests has a second highest consensus number of highest rankings in the at least the subset of ranking lists (e.g., re-rank with the other writer excluded). The computing device may wait when no second highest consensus number winner is detected so far but is still possible. When the computing device has the second highest consensus number of highest rankings in the at least the subset of ranking lists, the computing device interprets the at least the subset of write response ballots to determine whether the write threshold number of encoded data slices of the set of encoded data slices is listed in the at least the subset of lists of correctly stored new revision levels. When the write threshold have been stored correctly and the check revision matches the current revision, the computing device issues the finalize commands. When the write threshold has not been stored yet and is still possible, the computing device may wait for further write response ballots to achieve the read threshold number. When correct storage of the write threshold number of encoded data slices is not possible, the computing device issues the withdraw commands to the storage units.

Figure 5:
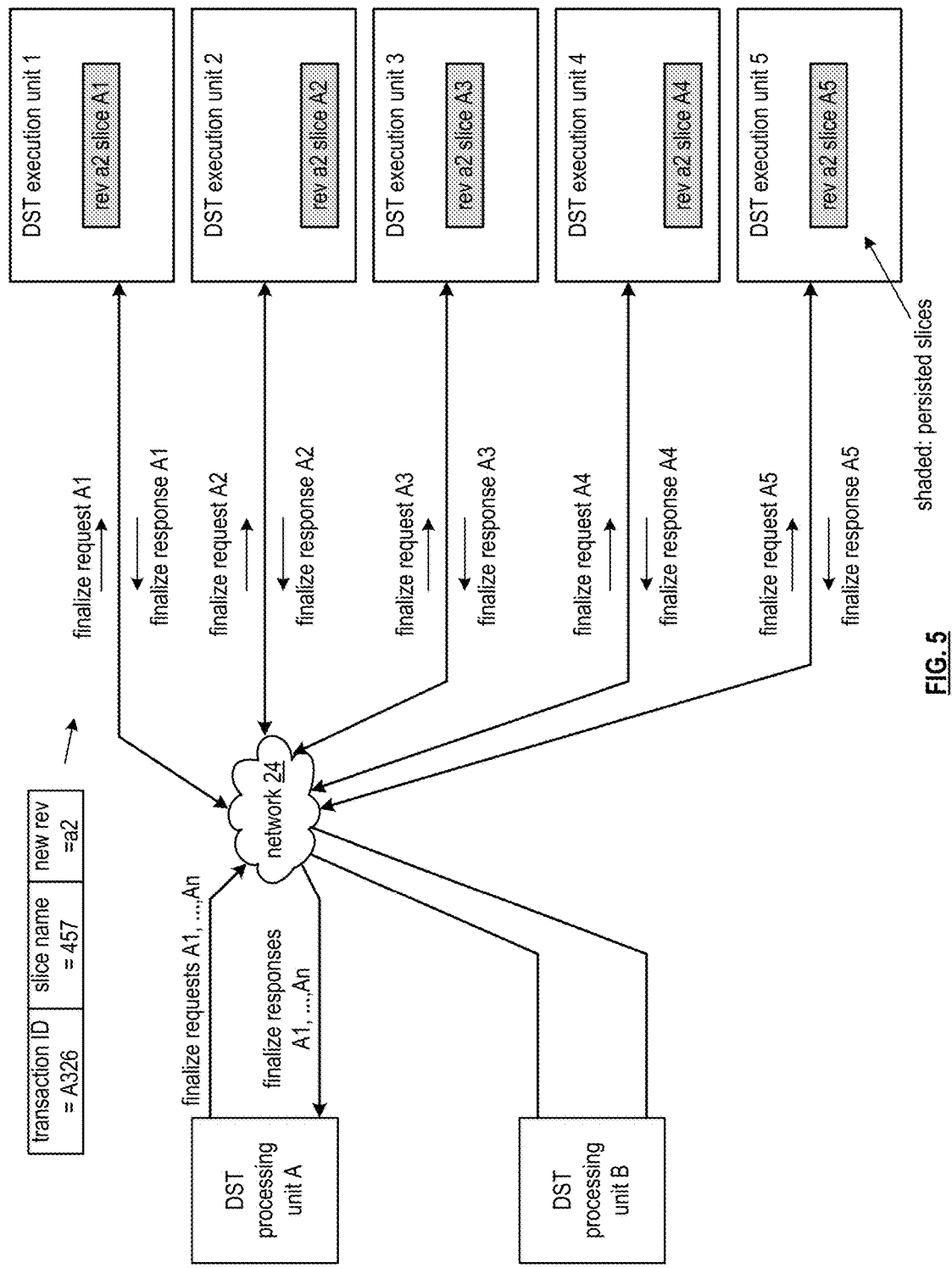
FIG. 5 is schematic block diagram of an example of another phase of a write operation in a dispersed storage network (DSN) in accordance with the present invention.

FIG. 5 further illustrates the example of operation where, when the write threshold number of encoded data slices is listed in the at least the subset of lists of correctly stored new revision levels, the computing device issues the set of finalize commands to the set of storage units. For example, the DST processing unit A, having determined that the DST processing unit A is the consensus winner, has successfully stored the at least the write threshold number of encoded data slices of the set of encoded data slices, and the check revision substantially matches the current revision, issues a set of finalize commands to the set of storage units. For instance, the DST processing unit A generates a set of finalize requests A1-An, sends, via the network 24, the set of finalize requests A1-An to the DST execution units 1-5. Each finalize request includes one or more of the transaction ID of a corresponding write request, the slice name of the write request, and the new revision level of the write request. For instance, the DST processing unit A generates the finalize requests A1 to include the transaction ID of A326, the slice name of 457, and the new revision level of a2 for the encoded data slice A1.

Each storage unit receiving the finalize request removes the write request information of ballot information associated with other write requests that did not carry the consensus highest number of rankings (e.g., other write requests including temporarily stored encoded data slices), removes the currently stored revision, and sends a finalize response indicating execution of a successful finalize phase. For example, the DST execution unit 1 receives the finalize request A1, deletes the previously stored revision 1 encoded data slice A1 (e.g., the currently stored encoded data slice), deletes the temporarily stored revision b2 encoded data slice B1, and sends a finalize response A1 indicating successful execution of the finalize phase within the DST execution unit 1.

Figure 6:
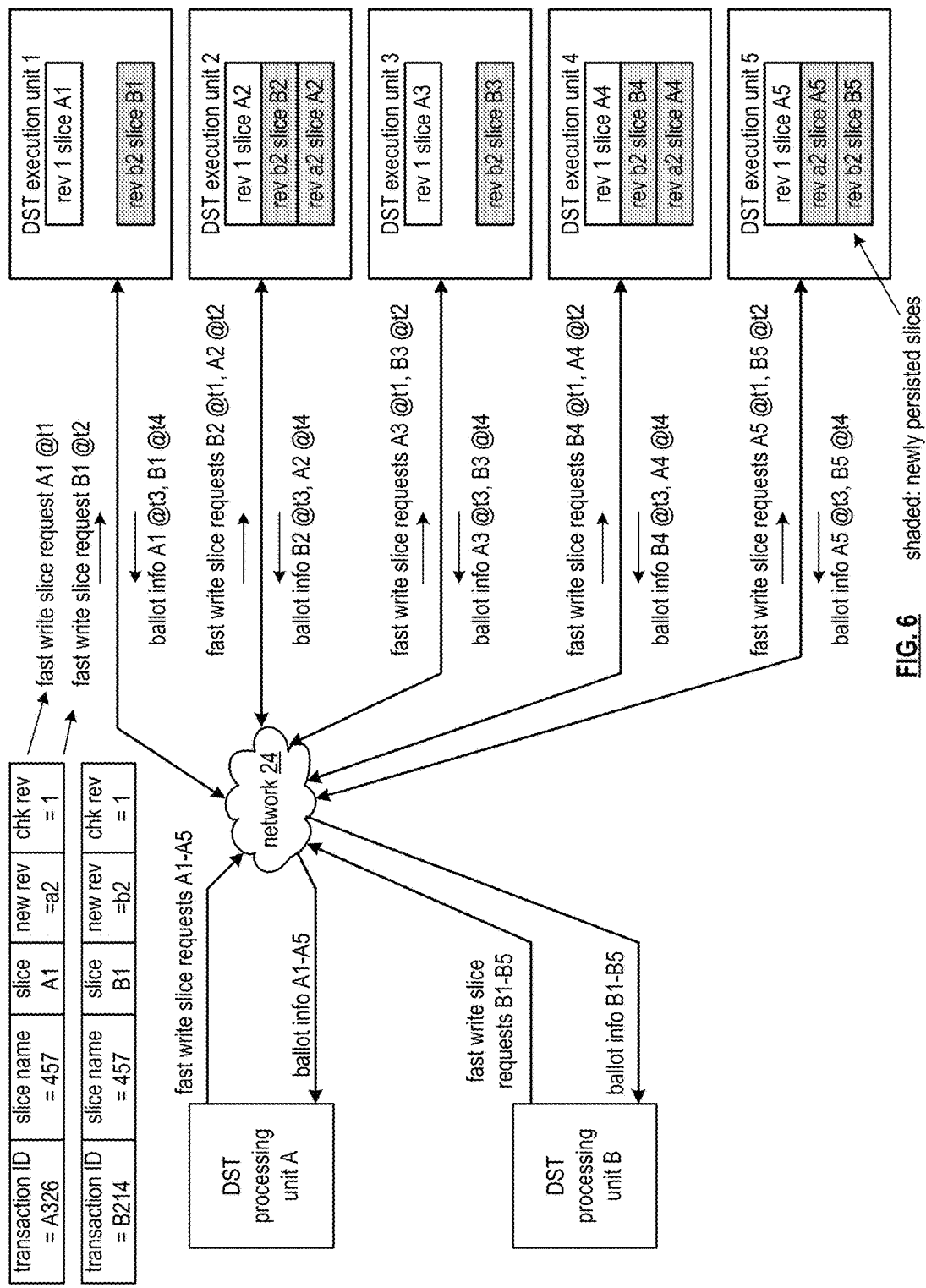
FIG. 6 is schematic block diagram of another example of another phase of a write operation in a dispersed storage network (DSN) in accordance with the present invention.

FIG. 6 illustrates another example of operation of the storing of the data with the revision consistency where the DST processing unit A sends, via the network 24, the set of fast write slice requests A1-A5 to the set of DST execution units 1-5 and the DST processing unit B sends, via the network 24, the other set of fast write slice requests B1-B5 to the set of DST execution units 1-5. The set of write requests and the other set of write requests may be received with varying time arrival order by the DST execution units. For example, DST execution unit 1 receives the fast write slice request A1 at a first time frame and receives the fast write slice request B1 at a second time frame (e.g., after receiving the fast write slice request A1). As another example, DST execution unit 2 receives the fast write slice request B2 at the first time frame and receives the fast write slice request A2 at the second time frame (e.g., after receiving the fast write slice request B2). As a whole, the set of DST execution units may receive more write requests first from one of the DST processing units. For example, the DST execution units 1, 3, and 5, receive the fast write slice requests A1, A3, and A5 ahead of the fast write slice requests B1, B2, and B5; and the DST execution units 2 and 4 receives the fast write slice requests B2 and B4 ahead of the fast write slice requests A2 and A4.

In response to sending the set of write requests regarding the set of encoded data slices sent to the set of storage units of a the DSN, the computing device (e.g., the DST processing unit A) receives, at least a subset of write response ballots from at least a subset of storage units of the set of storage units. A write response ballot of the at least the subset of write response ballots is received from a storage unit of the at least the subset of storage units regarding an encoded data slice of the set of encoded data slices.

The write response ballot includes the list of correctly stored new revision levels of the encoded data slice of pending write requests regarding the new revision levels of the set of encoded data slices and the ranking list of the pending write requests and wherein the at least the subset of write response ballots includes at least a subset of lists of correctly stored new revision levels and at least a subset of ranking lists. For example, upon receipt of the fast write slice request A1, the DST execution unit 1 issues, via the network 24, to the DST processing unit A, ballot information A1 at the third timeframe, where the ballot information A1 includes a list of correctly stored new revision levels of the encoded data slice 457 at that point in time (e.g., revision 1 of slice A1 as a previously successfully stored slice, but not the encoded data slice A1 of revision a2 when a storage error occurs). The ballot info A1 further indicates the ranking list of the pending write requests indicating that the fast write slice request A1 is the only pending write request at that point in time (e.g., shortly after timeframe 1 but before timeframe 2 when the fast write slice request B1 is received).

When another write request is received by the storage unit, the storage unit issues further ballot information to the other computing device. For example, when receiving the fast write slice request B1, the DST execution unit 1 issues, via the network 24, to the DST processing unit B, ballot information B1 at the fourth timeframe, where the ballot information B1 includes a list of correctly stored new revision levels of the encoded data slice 457 at that point in time (e.g., the revision 1 of slice A1 as the previously successfully stored slice, and the encoded data slice B1 of revision b2 as another new slice, but not the revision a2 of the slice A1 when the storage error occurs).

The ballot info B1 further indicates the ranking list of the pending write requests indicating that the fast write slice request A1 was received first and the fast write slice request B1 was received second at that point in time. As such, the DST processing unit A receives an indication that its request A1 was received first by the DST execution unit 1 and the DST processing unit B receives an indication that its request B1 was received second after the request A1 received from the DST processing unit A. Similarly, with regards to the requests sent to the second DST execution unit, the DST processing unit A receives ballot information indicating that its request A2 was received second after the request B2 received from the DST processing unit B (e.g., and slices B2 and A2 were successfully correctly stored within the DST execution unit 2 with no storage errors) and the DST processing unit B receives an indication that its request B2 was received first by the DST execution unit 2 (e.g., and slice B2 was successfully in correctly stored within the DST execution unit 2). FIG. 7 further illustrates the example of operation with regards to a perspective by each of the DST processing units A and B receiving the ballot information from the entire set of DST execution units.

FIG. 7 illustrates receiving ballot information in the other example of operation where the DST processing unit A (e.g., writer A) receives write response ballots that includes the ballot information from the storage units 1-5. The write response ballot from the storage unit 1 to the DST processing unit A indicates that the write request from the DST processing unit A is the first highest ranked received write request, that the previously stored current revision is the revision 1 slice A1, and that revision 1 slice A1 is currently stored but not the revision a2 of encoded data slice A1 as expected. In total, the DST processing unit A receives five write response ballots indicating that the DST processing unit A has the highest-ranking for three of the five storage units and that the encoded data slices A2, A4, and A5 (e.g., of revision a2) have been correctly stored in the storage units 2, 4, and 5. The DST processing unit B receives five other write response ballots indicating that the DST processing unit A has the highest ranking for the three of the five storage units, that each of the five encoded data slices B1-B5 of revision b2 have been stored in the storage units 1-5, and that correct storage of slices A1 and A3 has failed (e.g., A1, A3 failed, A2 and A4 are of an unknown storage status, and slice A5 has been stored correctly).

Each DST processing unit interprets the at least the subset of write response ballots (e.g., its received ballots) to determine whether write requests of the set of write requests has a consensus number of highest rankings in the at least the subset of ranking lists. For example, the DST processing unit A indicates that the write requests of the set of write requests A1-A5 has the consensus number of highest rankings when the DST processing unit A determines that the write requests 1, 3, and 5 have an earlier timestamp (e.g., first arrival at the corresponding storage unit) but the write requests 2 and 4 have a second earliest timestamp.

When the computing device has the consensus number of highest rankings in the at least the subset of ranking lists, the computing device interprets the at least the subset of write response ballots to determine whether the write threshold number of encoded data slices of the set of encoded data slices is listed in the at least the subset of lists of correctly stored new revision levels. For example, the DST processing unit A indicates that the write threshold number of encoded data slices of the set of encoded data slices is not listed in the at least a subset of lists of correctly stored new revision levels when interpreting the received write response ballots that indicates that two slices have failed to correctly store and three other slices have been correctly stored and the write threshold is 4. When the write threshold number of encoded data slices of the set of encoded data slices is not listed in the at least the subset of lists of correctly stored new revision levels, the computing device may issue a set of withdraw commands to the set of storage units regarding the set of encoded data slices and further determining that it is not possible to store the write threshold number. For example, the DST processing unit A issues the withdraw commands to the DST execution units 1-5 when determining that it is not possible for the DST processing unit A to correctly store the write threshold number of encoded data slices based on the received write response ballots.

When a particular computing device does not have the consensus number of the highest rankings in the at least the subset of ranking lists, the particular computing device interprets the at least the subset of write response ballots to determine whether yet another computing device has the consensus number of the highest rankings in the at least the subset of ranking lists, where the other computing device is associated with one of the pending write requests. For example, the DST processing unit B indicates that the DST processing unit B does not have the consensus number of the highest rankings when interpreting the received write response ballots that indicates that write requests 2 and 4 were the only first place received write requests from the DST processing unit B and that the DST processing unit A is the consensus winner with three of five write requests being received first.

When the other computing device does have the consensus number of the highest rankings in the at least the subset of ranking lists, the particular computing device interprets the at least the subset of write response ballots to determine whether the write threshold number of encoded data slices of another set of encoded data slices is listed in the at least the subset of lists of correctly stored new revision levels, where the other computing device issued another set of write requests for the another set of encoded data slices, where the another set of encoded data slices has a first revision level regarding a data segment of a data object and the set of encoded data slices has a second revision level regarding the data segment. For example, recognizing that the DST processing unit A is the consensus winner, the DST processing unit B interprets the received write response ballots to determine that the DST processing unit A will not be able to store the write threshold number of encoded data slices of its set of encoded data slices, noting that storage of two of the slices has definitely failed. Having determined that the DST processing unit A will never store the at least the write threshold number of encoded data slices, the DST processing unit B eliminates the DST processing unit A as the consensus winner.

When the write threshold number of encoded data slices of another set of encoded data slices is not listed in the at least the subset of lists of correctly stored new revision levels, the computing device interprets the at least the subset of write response ballots to determine whether write requests of the set of write requests has a second highest consensus number of highest rankings in the at least the subset of ranking lists (e.g., re-rank with the other writer excluded). When the computing device has the second highest consensus number of highest rankings in the at least the subset of ranking lists, the computing device interprets the at least the subset of write response ballots to determine whether the write threshold number of encoded data slices of the set of encoded data slices is listed in the at least the subset of lists of correctly stored new revision levels. For example, the DST processing unit B, recognizing that it has the second highest consensus number (e.g., 2), interprets the write response ballots to indicate that all five encoded data slices have been correctly stored by the set of storage units. When the write threshold have been stored correctly and the check revision matches the current revision, the computing device issues the finalize commands as is discussed in greater detail with reference to FIG. 8.

Figure 8:
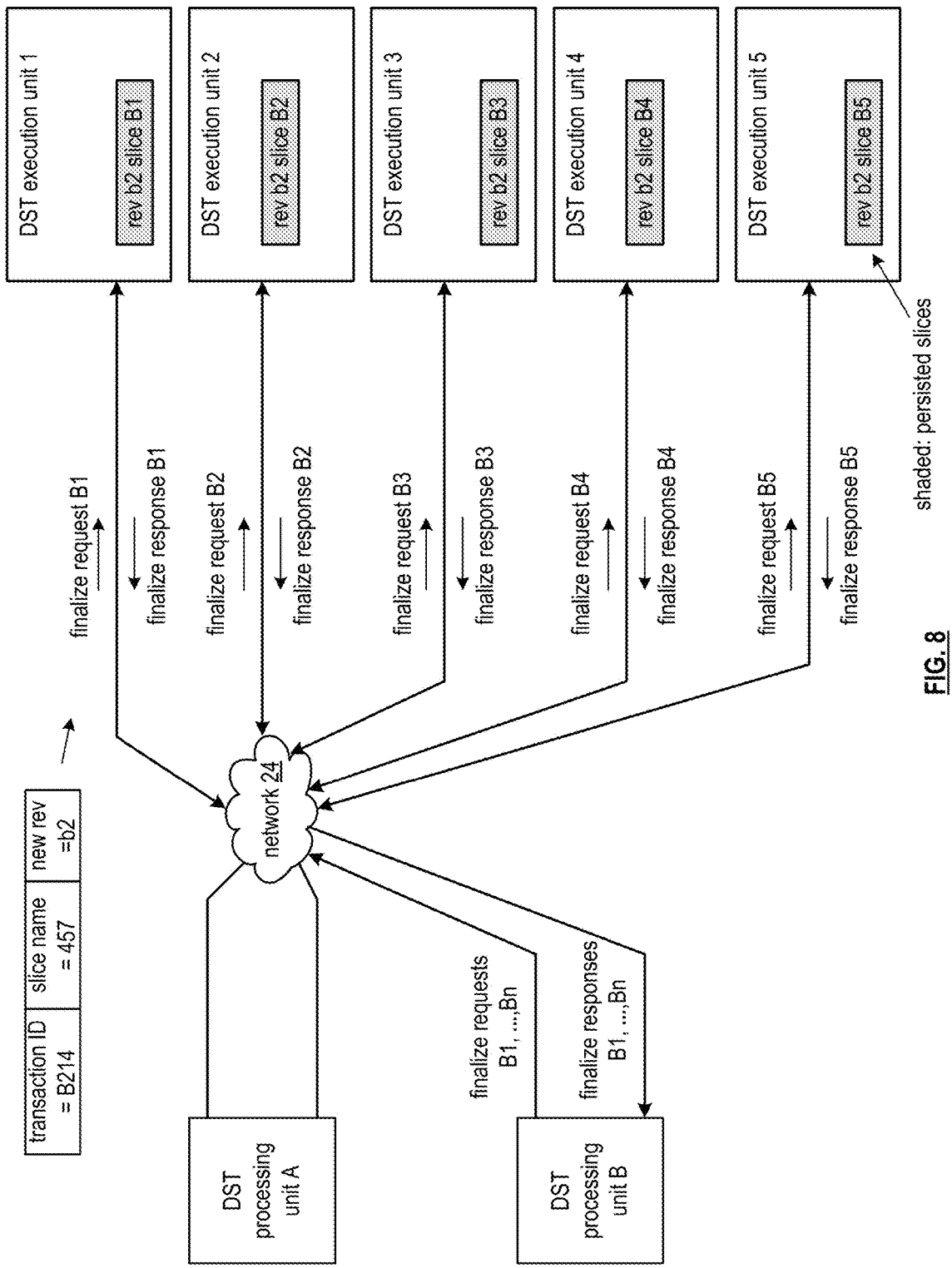
FIG. 8 is schematic block diagram of an example of another phase of a write operation in a dispersed storage network (DSN) in accordance with the present invention.

FIG. 8 further illustrates the example of operation where, when the write threshold number of encoded data slices is listed in the at least the subset of lists of correctly stored new revision levels, the computing device issues the set of finalize commands to the set of storage units. For example, the DST processing unit B, having determined that the DST processing unit B is the consensus winner (e.g., after ruling out the DST processing unit A based on the observance of the two storage failures), has successfully stored the at least the write threshold number of encoded data slices of the set of encoded data slices, and the check revision substantially matches the current revision, issues a set of finalize commands to the set of storage units. For instance, the DST processing unit B generates a set of finalize requests B1-Bn, sends, via the network 24, the set of finalize requests B1-Bn to the DST execution units 1-5. Each finalize request includes one or more of the transaction ID of a corresponding write request, the slice name of the write request, and the new revision level of the write request. For instance, the DST processing unit B generates the finalize requests B1 to include the transaction ID of B214, the slice name of 457, and the new revision level of b2 for the encoded data slice B1.

Each storage unit receiving the finalize request removes the write request information of ballot information associated with other write requests that did not carry the consensus highest number of rankings (e.g., other write requests including temporarily stored encoded data slices), removes the currently stored revision, and sends a finalize response indicating execution of a successful finalize phase. For example, the DST execution unit 5 receives the finalize request B5, deletes the previously stored revision 1 encoded data slice A5 (e.g., the currently stored encoded data slice), deletes the temporarily stored revision a2 encoded data slice A5, and sends a finalize response B1 indicating successful execution of the finalize phase within the DST execution unit 5.

Figure 9:
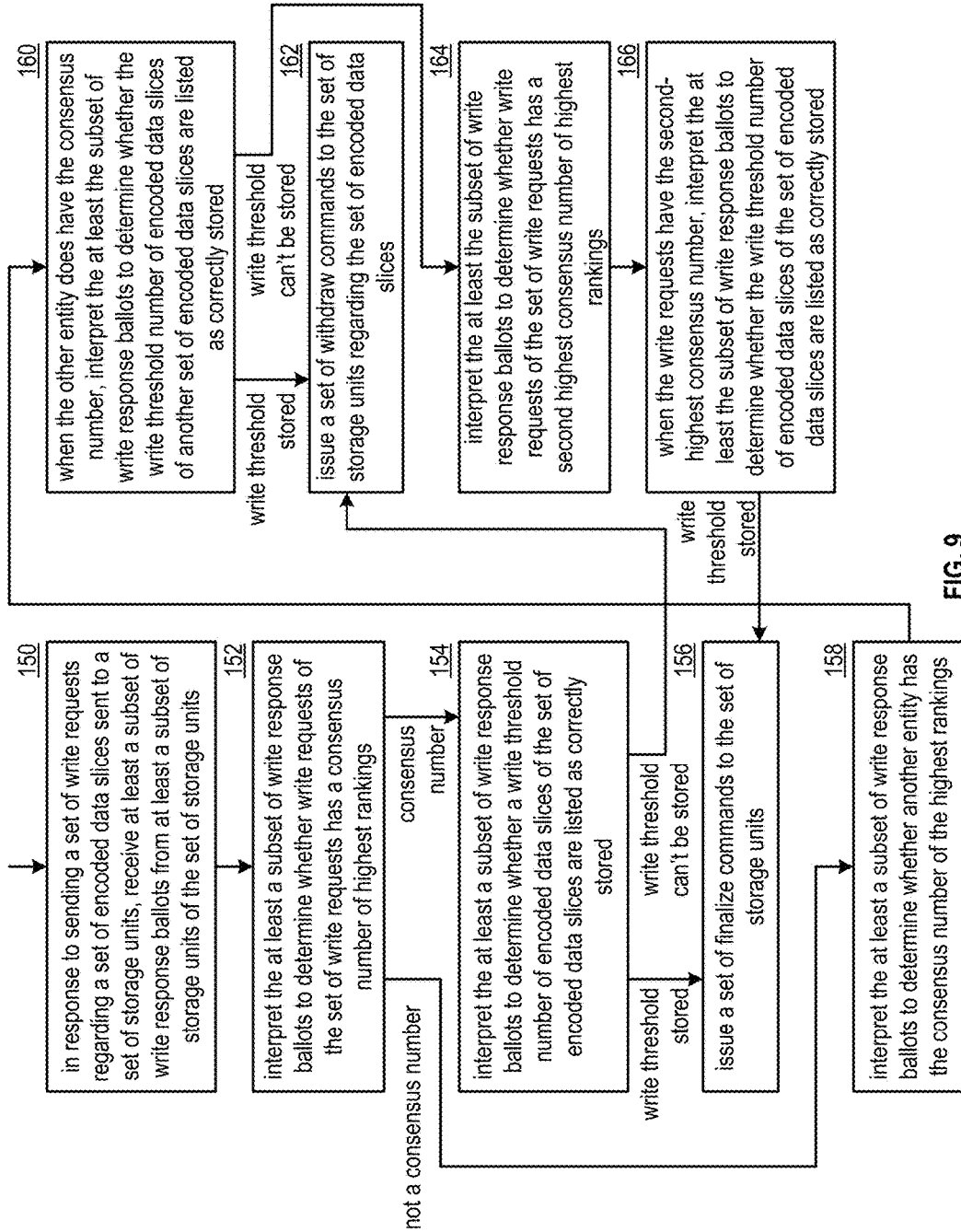
FIG. 9 is a logic diagram of an example of storing data to facilitate revision consistency in accordance with the present invention.

FIG. 9 is a flowchart illustrating an example of storing data to facilitate revision consistency. In particular, a method is presented for use in conjunction with one or more functions and features described in conjunction with FIGS. 1-2, 3-8, and also FIG. 9. The method begins at step 150 where a processing module of a computing device of one or more computing devices of a dispersed storage network (DSN), in response to sending a set of write requests regarding a set of encoded data slices sent to a set of storage units of the DSN, receives at least a subset of write response ballots from at least a subset of storage units of the set of storage units, where a write response ballot of the at least the subset of write response ballots is received from a storage unit of the at least the subset of storage units regarding an encoded data slice of the set of encoded data slices, where the write response ballot includes a list of correctly stored new revision levels of the encoded data slice of pending write requests regarding the new revision levels of the set of encoded data slices and a ranking list of the pending write requests and where the at least the subset of write response ballots includes at least a subset of lists of correctly stored new revision levels and at least a subset of ranking lists.

The method continues at step 152 where the processing module interprets the at least the subset of write response ballots to determine whether write requests of the set of write requests has a consensus number of highest rankings in the at least the subset of ranking lists. The determining the highest ranking within the ranking list may be based on a timestamp of when write requests of the pending write requests were received by the storage unit. The determining whether the computing device has the consensus number may further include the processing module of the computing device determining whether another computing device also has the consensus number of the highest rankings in the at least the subset of ranking lists. When the other computing device also has the consensus number of the highest rankings, the processing module implements a conflict avoidance protocol to establish that the computing device or the other computing device has the consensus number. The method branches to step 158 when the computing device does not have the consensus number of highest rankings. The method continues to step 154 when the computing device as the consensus number of highest rankings.

When the computing device has the consensus number of highest rankings in the at least the subset of ranking lists, processing module interprets the at least the subset of write response ballots to determine whether a write threshold number of encoded data slices of the set of encoded data slices is listed in the at least the subset of lists of correctly stored new revision levels. When the write threshold number of encoded data slices of the set of encoded data slices is not listed in the at least the subset of lists of correctly stored new revision levels, (e.g., can't ever) the method branches to step 162 to issue a set of withdraw commands to the set of storage units regarding the set of encoded data slices. Alternatively, the processing module may wait for the write threshold of encoded data slices to be correctly stored if still possible and further responses may confirm the successful storage of the read threshold number.

When the write threshold number of encoded data slices is listed in the at least the subset of lists of correctly stored new revision levels, the interpreting of the write response ballots may further include the processing module verifying a current revision level of the encoded data slice (e.g., a check revision level of the request matches a local current stored revision level of a stored slice), where the write response ballot includes the local current revision level of the encoded data slices of the storage unit. When not verified, the processing module may rule out the computing device and seek another entity (e.g., another computing device) with consensus. When verified, the method continues to step 156. When the write threshold number of encoded data slices is listed in the at least the subset of lists of correctly stored new revision levels, the method continues at step 156 where the processing module issues a set of finalize commands to the set of storage units.

When the computing device does not have the consensus number of the highest rankings in the at least the subset of ranking lists, the method continues at step 158 where the processing module interprets the at least the subset of write response ballots to determine whether another computing device has the consensus number of the highest rankings in the at least the subset of ranking lists, where the other computing device is associated with one of the pending write requests. The processing module may wait when no consensus exists for another computing device.

When the other computing device does have the consensus number of the highest rankings in the at least the subset of ranking lists, the method continues at step 160 where the processing module interprets the at least the subset of write response ballots to determine whether the write threshold number of encoded data slices of another set of encoded data slices is listed in the at least the subset of lists of correctly stored new revision levels, where the other computing device issued another set of write requests for the another set of encoded data slices, where the another set of encoded data slices has a first revision level regarding a data segment of a data object and the set of encoded data slices has a second revision level regarding the data segment. When the write threshold number of encoded data slices have not been correctly stored as of yet but is still possible, the processing module may wait. When the write threshold number will never be correctly stored, the method branches to step 164 as the processing module rules out the other entity. When the write threshold number of encoded data slices of another set of encoded data slices is listed in the at least the subset of lists of correctly stored new revision levels the method branches to step 162.

The method continues at step 162 where the processing module issues the set of withdraw commands to the set of storage units regarding the set of encoded data slices. When the write threshold number of encoded data slices of another set of encoded data slices is not listed in the at least the subset of lists of correctly stored new revision levels, the processing module interprets the at least the subset of write response ballots to determine whether write requests of the set of write requests has a second highest consensus number of highest rankings in the at least the subset of ranking lists (e.g., re-rank with the other entity excluded). When the processing module determines that consensus has not been reached yet and may be possible, the processing module may wait to identify a yet another entity with consensus.

When the computing device has the second highest consensus number of highest rankings in the at least the subset of ranking lists, the method continues at step 166 where the processing module interprets the at least the subset of write response ballots to determine whether the write threshold number of encoded data slices of the set of encoded data slices is listed in the at least the subset of lists of correctly stored new revision levels. When the write threshold number of encoded data slices have not yet been correctly stored but is still possible, the processing module may wait. When it is not possible to correctly store the read threshold number of encoded data slices, the processing module rules out the computing device and issues the withdraw commands. When the write threshold number of encoded data slices is listed in the at least the subset of lists of correctly stored new revision levels, the method branches back to step 156 where the processing module issues the set of finalize commands to the set of storage units.

The method described above in conjunction with the processing module can alternatively be performed by other modules of the dispersed storage network or by other devices. For example, any combination of a first module, a second module, a third module, a fourth module, etc. of the computing device may perform the method described above.

In addition, at least one memory section (e.g., a first memory section, a second memory section, a third memory section, a fourth memory section, a fifth memory section, a sixth memory section, etc. of a non-transitory computer readable storage medium, i.e., a computer readable memory device) that stores operational instructions can, when executed by one or more processing modules of one or more computing devices of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:

in response to sending a set of write requests regarding a set of encoded data slices having a first revision level of a data segment of a data object to a set of storage units of a dispersed storage network (DSN), receiving, by a computing device of a plurality of computing devices of the DSN, at least a subset of write response ballots from at least a subset of storage units of the set of storage units, wherein a write response ballot of the at least the subset of write response ballots is received from a storage unit of the at least the subset of storage units regarding an encoded data slice of the set of encoded data slices, wherein the write response ballot includes a list of stored new revision levels of the encoded data slice of pending write requests regarding the new revision levels of the set of encoded data slices and a ranking list of the pending write requests, wherein the pending write requests include the set of write requests and one or more other sets of write requests regarding storage of one or more other sets of encoded data slices having one or more other revision levels of the data segment from one or more other computing devices of the plurality of computing devices of the DSN, wherein the ranking list of the pending write requests lists the pending write requests in order of timestamp of receipt by the storage unit, and wherein the at least the subset of write response ballots includes at least a subset of lists of stored new revision levels of encoded data slices of the data segment and at least a subset of ranking lists of the pending write requests;

interpreting, by the computing device, the at least the subset of write response ballots to determine whether write requests of the set of write requests has a consensus number of highest rankings in the at least the subset of ranking lists of the pending write requests;

when the computing device has the consensus number of highest rankings in the at least the subset of ranking lists of the pending write requests, interpreting, by the computing device, the at least the subset of write response ballots to determine whether a write threshold number of encoded data slices of the set of encoded data slices is listed in the at least the subset of lists of stored new revision levels of encoded data slices of the data segment; and when the write threshold number of encoded data slices is listed in the at least the subset of lists of stored new revision levels of encoded data slices of the data segment, issuing, by the computing device, a set of finalize commands to the set of storage units.

2. The method of claim 1 further comprises:

when the computing device does not have the consensus number of the highest rankings in the at least the subset of ranking lists of the pending write requests, interpreting, by the computing device, the at least the subset of write response ballots to determine whether another computing device of the one or more other computing devices of the plurality of computing devices of the DSN has the consensus number of the highest rankings in the at least the subset of ranking lists of the pending write requests, wherein the other computing device is associated with one of the one or more other sets of write requests of the pending write requests regarding another set of encoded data slices having another revision level of the data segment;

when the other computing device does have the consensus number of the highest rankings in the at least the subset of ranking lists of the pending write requests, interpreting, by the computing device, the at least the subset of write response ballots to determine whether the write threshold number of encoded data slices of the other set of encoded data slices is listed in the at least the subset of lists of stored new revision levels of encoded data slices of the data segment; and when the write threshold number of encoded data slices of the other set of encoded data slices is listed in the at least the subset of lists of stored new revision levels of encoded data slices of the data segment, issuing a set of withdraw commands to the set of storage units regarding the set of encoded data slices.

3. The method of claim 2 further comprises:

when the write threshold number of encoded data slices of the other set of encoded data slices is not listed in the at least the subset of lists of stored new revision levels of encoded data slices of the data segment, interpreting, by the computing device, the at least the subset of write response ballots to determine whether write requests of the set of write requests has a second highest consensus number of highest rankings in the at least the subset of ranking lists of the pending write requests;

when the computing device has the second highest consensus number of highest rankings in the at least the subset of ranking lists of the pending write requests, interpreting, by the computing device, the at least the subset of write response ballots to determine whether the write threshold number of encoded data slices of the set of encoded data slices is listed in the at least the subset of lists of stored new revision levels of encoded data slices of the data segment; and when the write threshold number of encoded data slices of the set of encoded data slices is listed in the at least the subset of lists of stored new revision levels of encoded data slices of the data segment, issuing, by the computing device, the set of finalize commands to the set of storage units.

4. The method of claim 1 further comprises:

when the write threshold number of encoded data slices of the set of encoded data slices is not listed in the at least the subset of lists of stored new revision levels of encoded data slices of the data segment, issuing a set of withdraw commands to the set of storage units regarding the set of encoded data slices.

5. The method of claim 1, wherein the determining whether the computing device has the consensus number comprises:

determining, by the computing device, whether another computing device of the one or more other computing devices of the plurality of computing devices of the DSN also has the consensus number of the highest rankings in the at least the subset of ranking lists of the pending write requests; and when the other computing device also has the consensus number of the highest rankings, implementing, by the computing device, a conflict avoidance protocol to establish that the computing device or the other computing device has the consensus number.

6. The method of claim 1 further comprises:

verifying, by the computing device, a current revision level of the encoded data slice of the set of encoded data slices, wherein the write response ballot includes a local current revision level of the encoded data slice of the set of encoded data slices of the storage unit.

7. A computing device of a plurality of computing devices of a dispersed storage network (DSN) comprising:

an interface;

memory; and a processing module operably coupled to the interface and the memory, wherein the processing module is operable to:

in response to sending a set of write requests regarding a set of encoded data slices having a first revision level of a data segment of a data object to a set of storage units of the DSN, receive, via the interface, at least a subset of write response ballots from at least a subset of storage units of the set of storage units, wherein a write response ballot of the at least the subset of write response ballots is received from a storage unit of the at least the subset of storage units regarding an encoded data slice of the set of encoded data slices, wherein the write response ballot includes a list of stored new revision levels of the encoded data slice of pending write requests regarding the new revision levels of the set of encoded data slices and a ranking list of the pending write requests, wherein the pending write requests include the set of write requests and one or more other sets of write requests regarding storage of one or more other sets of encoded data slices having one or more other revision levels of the data segment from one or more other computing devices of the plurality of computing devices of the DSN, wherein the ranking list of the pending write requests lists the pending write requests in order of timestamp of receipt by the storage unit, and wherein the at least the subset of write response ballots includes at least a subset of lists of stored new revision levels of encoded data slices of the data segment and at least a subset of ranking lists of the pending write requests;

interpret the at least the subset of write response ballots to determine whether write requests of the set of write requests has a consensus number of highest rankings in the at least the subset of ranking lists of the pending write requests;

when the computing device has the consensus number of highest rankings in the at least the subset of ranking lists of the pending write requests, interpret the at least the subset of write response ballots to determine whether a write threshold number of encoded data slices of the set of encoded data slices is listed in the at least the subset of lists of stored new revision levels of encoded data slices of the data segment; and when the write threshold number of encoded data slices is listed in the at least the subset of lists of stored new revision levels of encoded data slices of the data segment, issue, via the interface, a set of finalize commands to the set of storage units.

8. The computing device of claim 7, wherein the processing module is further operable to:
when the computing device does not have the consensus number of the highest rankings in the at least the subset of ranking lists of the pending write requests, interpret the at least the subset of write response ballots to determine whether another computing device of the one or more other computing devices of the plurality of computing devices of the DSN has the consensus number of the highest rankings in the at least the subset of ranking lists of the pending write requests, wherein the other computing device is associated with one of the one or more other sets of write requests of the pending write requests regarding another set of encoded data slices having another revision level of the data segment;

when the other computing device does have the consensus number of the highest rankings in the at least the subset of ranking lists of the pending write requests, interpret the at least the subset of write response ballots to determine whether the write threshold number of encoded data slices of the other set of encoded data slices is listed in the at least the subset of lists of stored new revision levels of encoded data slices of the data segment; and when the write threshold number of encoded data slices of the other set of encoded data slices is listed in the at least the subset of lists of stored new revision levels of encoded data slices of the data segment, issue, via the interface, a set of withdraw commands to the set of storage units regarding the set of encoded data slices.

9. The computing device of claim 8, wherein the processing module is further operable to:
when the write threshold number of encoded data slices of the other set of encoded data slices is not listed in the at least the subset of lists of stored new revision levels of encoded data slices of the data segment, interpret the at least the subset of write response ballots to determine whether write requests of the set of write requests has a second highest consensus number of highest rankings in the at least the subset of ranking lists of the pending write requests;

when the computing device has the second highest consensus number of highest rankings in the at least the subset of ranking lists of the pending write requests, interpret the at least the subset of write response ballots to determine whether the write threshold n umber of encoded data slices of the set of encoded data slices is listed in the at least the subset of lists of stored new revision levels of encoded data slices of the data segment; and when the write threshold number of encoded data slices of the set of encoded data slices is listed in the at least the subset of lists of stored new revision levels of encoded data slices of the data segment, issue, via the interface, the set of finalize commands to the set of storage units.

10. The computing device of claim 7, wherein the processing module is further operable to:
when the write threshold number of encoded data slices of the set of encoded data slices is not listed in the at least the subset of lists of stored new revision levels of encoded data slices of the data segment, issue, via the interface, a set of withdraw commands to the set of storage units regarding the set of encoded data slices.

11. The computing device of claim 7, wherein the processing module is further operable to determine whether the computing device has the consensus number by:
determining whether another computing device of the one or more other computing devices of the plurality of computing devices of the DSN also has the consensus number of the highest rankings in the at least the subset of ranking lists of the pending write requests; and when the other computing device also has the consensus number of the highest rankings, implement a conflict avoidance protocol to establish that the computing device or the other computing device has the consensus number.

12. The computing device of claim 7, wherein the processing module is further operable to:
verify a current revision level of the encoded data slice of the set of encoded data slices, wherein the write response ballot includes a local current revision level of the encoded data slice of the set of encoded data slices of the storage unit.

13. A computer readable memory device comprises:
a first memory section that stores operational instructions that, when executed by a computing device of a plurality of computing devices of a dispersed storage network (DSN), causes the computing device to:
in response to sending a set of write requests regarding a set of encoded data slices having a first revision level of a data segment of a data object to a set of storage units of the DSN, receive at least a subset of write response ballots from at least a subset of storage units of the set of storage units, wherein a write response ballot of the at least the subset of write response ballots is received from a storage unit of the at least the subset of storage units regarding an encoded data slice of the set of encoded data slices, wherein the write response ballot includes a list of stored new revision levels of the encoded data slice of pending write requests regarding the new revision levels of the set of encoded data slices and a ranking list of the pending write requests, wherein the pending write requests include the set of write requests and one or more other sets of write requests regarding storage of one or more other sets of encoded data slices having one or more other revision levels of the data segment from one or more other computing devices of the plurality of computing devices of the DSN, wherein the ranking list of the pending write requests lists the pending write requests in order of timestamp of receipt by the storage unit, and wherein the at least the subset of write response ballots includes at least a subset of lists of stored new revision levels of encoded data slices of the data segment and at least a subset of ranking lists of the pending write requests;

a second memory section that stores operational instructions that, when executed by the computing device, causes the computing device to:

interpret the at least the subset of write response ballots to determine whether write requests of the set of write requests has a consensus number of highest rankings in the at least the subset of ranking lists of the pending write requests; and when the computing device has the consensus number of highest rankings in the at least the subset of ranking lists of the pending write requests, interpret the at least the subset of write response ballots to determine whether a write threshold number of encoded data slices of the set of encoded data slices is listed in the at least the subset of lists of stored new revision levels of encoded data slices of the data segment; and a third memory section that stores operational instructions that, when executed by the computing device, causes the computing device to:

when the write threshold number of encoded data slices is listed in the at least the subset of lists of stored new revision levels of encoded data slices of the data segment, issue a set of finalize commands to the set of storage units.

14. The computer readable memory device of claim 13 further comprises:

a fourth memory section that stores operational instructions that, when executed by the computing device, causes the computing device to:

when the computing device does not have the consensus number of the highest rankings in the at least the subset of ranking lists of the pending write requests, interpret the at least the subset of write response ballots to determine whether another computing device of the one or more other computing devices of the plurality of computing devices of the DSN has the consensus number of the highest rankings in the at least the subset of ranking lists of the pending write requests, wherein the other computing device is associated with one of the one or more other sets of write requests of the pending write requests regarding another set of encoded data slices having another revision level of the data segment;

when the other computing device does have the consensus number of the highest rankings in the at least the subset of ranking lists of the pending write requests, interpret the at least the subset of write response ballots to determine whether the write threshold number of encoded data slices of the other set of encoded data slices is listed in the at least the subset of lists of stored new revision levels of encoded data slices of the data segment; and when the write threshold number of encoded data slices of the other set of encoded data slices is listed in the at least the subset of lists of stored new revision levels of encoded data slices of the data segment, issue, via the interface, a set of withdraw commands to the set of storage units regarding the set of encoded data slices.

15. The computer readable memory device of claim 14 further comprises:

the fourth memory section further stores operational instructions that, when executed by the computing device, causes the computing device to:

when the write threshold number of encoded data slices of the other set of encoded data slices is not listed in the at least the subset of lists of stored new revision levels of encoded data slices of the data segment, interpret the at least the subset of write response ballots to determine whether write requests of the set of write requests has a second highest consensus number of highest rankings in the at least the subset of ranking lists of the pending write requests;

when the computing device has the second highest consensus number of highest rankings in the at least the subset of ranking lists of the pending write requests, interpret the at least the subset of write response ballots to determine whether the write threshold number of encoded data slices of the set of encoded data slices is listed in the at least the subset of lists of stored new revision levels of encoded data slices of the data segment; and when the write threshold number of encoded data slices of the set of encoded data slices is listed in the at least the subset of lists of stored new revision levels of encoded data slices of the data segment, issue, via the interface, the set of finalize commands to the set of storage units.

16. The computer readable memory device of claim 13 further comprises:

a fourth memory section that stores operational instructions that, when executed by the computing device, causes the computing device to:

when the write threshold number of encoded data slices of the set of encoded data slices is not listed in the at least the subset of lists of stored new revision levels of encoded data slices of the data segment, issue, via the interface, a set of withdraw commands to the set of storage units regarding the set of encoded data slices.

17. The computer readable memory device of claim 13 wherein the second memory section further stores operational instructions that, when executed by the computing device, causes the computing device to determine whether the computing device has the consensus number by:

determining whether another computing device of the one or more other computing devices of the plurality of computing devices of the DSN also has the consensus number of the highest rankings in the at least the subset of ranking lists of the pending write requests; and when the other computing device also has the consensus number of the highest rankings, implement a conflict avoidance protocol to establish that the computing device or the other computing device has the consensus number.

18. The computer readable memory device of claim 13 further comprises:

a fourth memory section that stores operational instructions that, when executed by the computing device, causes the computing device to:

verify a current revision level of the encoded data slice of the set of encoded data slices, wherein the write response ballot includes a local current revision level of the encoded data slice of the set of encoded data slices of the storage unit.

* * * * *